Oct. 3, 1950     H. MICHAELS     2,524,354
RAILWAY VEHICLE WHEEL
Filed Jan. 26, 1946
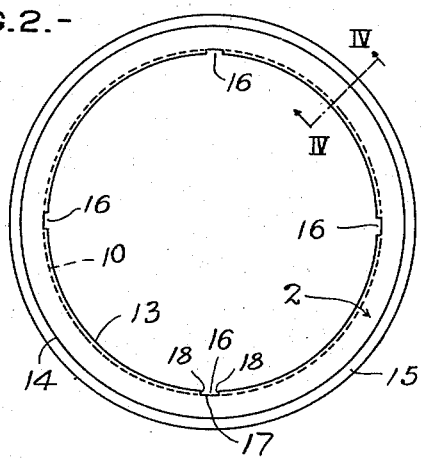
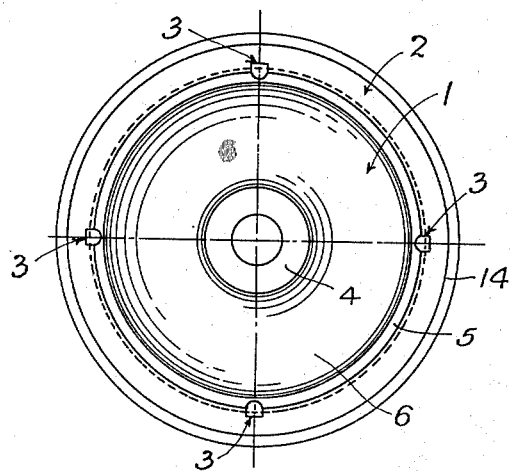
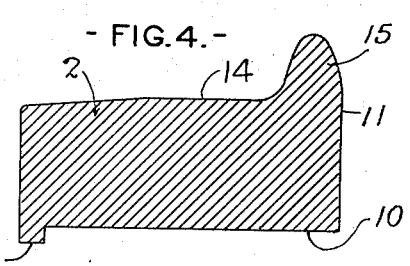
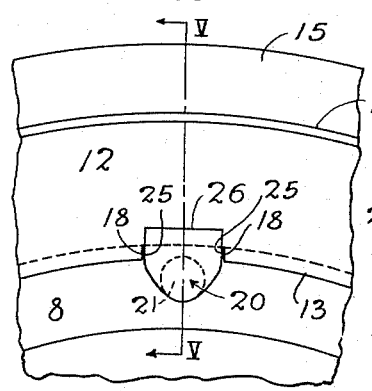
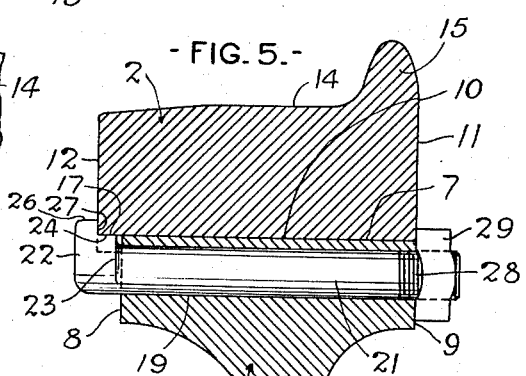
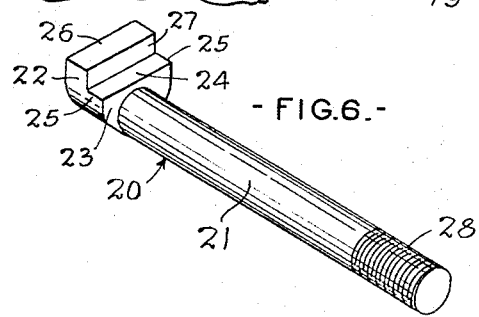
INVENTOR
*Hunter Michaels*
BY
*S. C. Yeaton*
ATTORNEY Patented Oct. 3, 1950

2,524,354

UNITED STATES PATENT OFFICE 2,524,354

RAILWAY VEHICLE WHEEL

Hunter Michaels, New York, N. Y., assignor to American Locomotive Company, New York, N. Y., a corporation of New York Application January 26, 1946, Serial No. 643,695

9 Claims. (Cl. 295—20)

This invention relates to a railway vehicle wheel, and more particularly to a railway vehicle wheel having a removable tire.

Railway vehicle wheels of this type ordinarily include a wheel center and a separate tire. The center has a rim which is substantially rectangular in cross section, the side faces of the rim being at right angles to the outer cylindrical peripheral face of the rim. The tire has a cylindrical inner face with a radially inwardly extending flange or lip at one side only, namely the side opposite the wheel flange. It is conventional practice to heat the tire, to place it on the rim with the lip engaging one side face of the rim and then to permit the tire to cool so that it shrinks on the rim and is secured thereto only by the tightness of its fit. The lip abutting the adjacent rim side face opposes wheel flange thrusts.

It is well known that tires heat up due to braking action, and this heat is not fully transmitted across the joint between the tire and rim with the result that the tire expands and becomes loose on the rim, permitting the tire to remain stationary due to the application of the brakes on its outer surface while the rim rotates therein. Furthermore when this looseness occurs during braking there is nothing to prevent the tire from moving laterally outwardly relative to the rim.

An object of the present invention is to provide a railway vehicle wheel of the type having a separate tire in which means are provided preventing any movement of the tire relative to the wheel center and rim.

A further object is to provide a wheel as aforesaid in which the means for preventing relative movement between the tire and rim does not interfere with continuous unimpaired engagement of the outer cylindrical peripheral face of the rim and the opposed cylindrical inner face of the tire.

Other and further objects of this invention will appear from the following description, the accompanying drawing and the appended claims.

Referring to the drawing forming a part of this application, Figure 1 is an elevation of a railway vehicle wheel constructed in accordance with this invention; Fig. 2 is an elevation of the tire of the wheel; Fig. 3 is an enlarged view of a portion of the wheel, showing one of the means for preventing relative movement between the tire and rim; Fig. 4 is an enlarged section on the line IV—IV of Fig. 2; Fig. 5 is a section on the line V—V of Fig. 3, parts being shown in full; and Fig. 6 is a perspective view of a device forming part of the aforesaid means.

The railway vehicle wheel, according to the present invention, includes a wheel center 1, a tire 2, and means 3 for preventing all relative movement between the wheel center and tire. The wheel center has a hub 4, a rim 5, and a web 6 connecting the hub and rim. The rim has an outer cylindrical peripheral face 7, an outer side face 8, and an inner side face 9, faces 8 and 9 being at right angles to face 7. Tire 2 has an inner cylindrical face 10 engaging face 7, an inner side face 11 and an outer side face 12. Side face 11 is shown in line with face 9 but in practice the rim 5 may extend slightly beyond face 11. Face 12 is disposed considerably outwardly of face 8 and the tire further includes a radially inwardly extending flange or lip 13 which engages face 8. This lip 13 is quite short in a radial direction, that is, it overlaps face 8 only a short distance. The outer face of lip 13 is in line with face 12. Face 10 is substantially of the same width as the maximum rim width so that the entire face 7 is utilized for support of the tire. The tire has the usual wear face 14 for rolling on the rail, and a wheel flange 15, the flange 15 being at the inner side of the tire and the lip 13 being at the outer side of the tire. The wheel as thus far described is conventional.

The wheel may be provided with as many means 3 as is desired. Four equally spaced means 3 are shown in the drawing. The four means 3 are similar and only one will be described.

Means 3 includes a slot 16 cut into the lip 13. This slot has a bottom curved face 17 in line with face 10 and has parallel side faces 18 substantially at right angles to the face 17. The rim 5 has a cylindrical transverse bore 19 opening through both of the side faces 8 and 9 and being disposed quite close to the face 7. It will be noted that the lip 13 extends radially inwardly only slightly beyond the radially outermost part of the bore 19. The means further includes a device 20. Device 20 includes a shank 21 which extends through the bore 19. At its outer end the shank is integral with a head 22 which has a flat face 23 perpendicular to the axis of shank 21 and parallel to and in slightly spaced relation with the face 8, a face 24 at right angles to the face 23 and opposite the face 17, and flat faces 25 at opposite ends of the face 24 and opposed to the faces 18, faces 25 being at right angles to faces 23 and 24.

A flange 26 is formed integral with the head 22 and has a face 27 parallel to the face 23 and overlapping and engaging face 12, face 27 being the same length as and at right angles to the face 24 and forming a shoulder with the face 24. The shank at the other end has threads 28 and this threaded end extends beyond the face 9 and has threaded thereon a grip nut 29 which is of a well-known type and which will not become loose in service.

In manufacturing the wheel the tire is heated and slipped on the rim with its slots 16 in line with the bores 19. The devices 20 are then slipped into the bores 19 so that their threaded ends are at the side of the wheel at which the wheel flange is disposed. The grip nuts 29 are then threaded on the shanks 21 and drawn up tightly. The faces 27 engage the face 12 and as the nuts 29 are tightened up the faces 27 pull the tire until the lip 13 tightly engages the face 8 and the inner faces of the nuts 29 tightly engage the face 9. The faces 25 will then be disposed between their correlated faces 18 and there will be at the most only a slight working clearance so that any tendency of relative rotary movement between the tire and wheel center will result in abutting of corresponding faces 25 of the devices with adjacent correlated faces 18 of the slots 16 of the tire. Thus relative rotary movement between the tire and wheel center is prevented.

The lip 13 prevents relative lateral movement of the tire inwardly of the wheel center when abutting the face 8. Relative lateral movement of the tire outwardly of the wheel center is prevented by the abutting of the face 12 with the faces 27. Thus any relative movement between the tire and wheel center is prevented.

The nuts 29 overlap the face 11. However, since the faces 27 are in tight engagement with the face 12, and since the nuts 29 are in tight engagement with the face 9, the faces 23 will not be in tight engagement with the face 8 and the nuts 29 will not be in tight engagement with the face 11. The nuts 29 are shown in the drawing in engagement with the face 11 as this is a preferable arrangement, but because of difficulty in controlling dimensions, the width of the tire will be proportioned so that the rim is tightly held between the lip 13 and the nuts 29 before the faces 23 and the nuts 29 are drawn up tightly respectively on the faces 8 and 11.

It will be seen from the foregoing that the face 7 is an uninterrupted and unimpaired cylinder which is necessary in order that it provide the proper support for the tire. Any interruption in the face 7 would be a factor in causing incipient fractures in the face 10 of the tire which might eventually lead to tire breakage. Similarly the entire portion of face 10 which is in engagement with the face 7 is cylindrical and is uninterrupted and unimpaired. In other words, the employment of means to prevent all relative movement between the tire and wheel center has been accomplished without impairing the continuous cylindrical engagement between the tire and the rim. The only alteration that a conventional tire requires to adapt it for the present invention is the provision of the slot 16 which may be economically and accurately machined. The only alteration that a conventional wheel rim requires to adapt it for the present invention is the drilling of the bores 19 which, of course, may be economically and accurately accomplished. Furthermore the device 20 is of a construction lending itself to economical production.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A railway vehicle wheel comprising a wheel center having a rim provided with a peripheral cylindrical face, opposite side faces and a transverse passageway opening through said side faces; a tire having opposite side faces, a cylindrical face in engagement with said rim cylindrical face, a lip extending radially inwardly from said tire cylindrical face in overlapping engagement with the adjacent rim side face preventing lateral movement of said tire in one direction relative to said rim, and a slot in and confined to said lip in line with said passageway; and a device having a shank extending through said passageway and members at its opposite ends having faces perpendicular to said shank, one of said members having a portion disposed in said slot preventing relative rotation between said tire and said rim and having another portion offset from said first portion and overlapping the adjacent portion of said tire preventing lateral movement of said tire in the opposite direction relative to said rim, and the other of said members engaging the adjacent rim side face.

2. A railway vehicle wheel as defined in claim 1 wherein each of the cylindrical faces is continuous and uninterrupted and their engagement is uninterrupted.

3. A railway vehicle wheel comprising a wheel center having a rim provided with a peripheral cylindrical face, opposite side faces and a transverse passageway opening through said side faces; a tire having a cylindrical face in engagement with said rim cylindrical face, a lip extending radially inwardly from said tire cylindrical face in overlapping relation with the adjacent rim side face, and a slot in and confined to said lip in line with said passageway, said slot having spaced end faces, said lip preventing relative lateral movement between said tire and said rim in one direction; and a device having a shank extending through said passageway, a head at one end of said shank having a portion disposed in said slot and adapted to abut said end faces thereof preventing relative rotary movement between said tire and said rim, a flange extending from said head and being offset from said portion and overlapping the adjacent side wall of said tire preventing relative lateral movement between said tire and said rim in the opposite direction, said shank at its other end extending beyond said rim, and means securing said shank other end to said rim.

4. A railway vehicle wheel comprising a wheel center having a rim provided with a peripheral cylindrical face, an outer side face, an inner side face and a transverse passageway opening through said side faces; a tire having a cylindrical face in engagement with said rim cylindrical face, an outer side face, an inner side face, a lip extending radially inwardly from said tire cylindrical face in overlapping relation with said rim outer side face, and a slot in and confined to said lip in line with said passageway, said slot having spaced end faces, said lip preventing lateral movement of said tire inwardly relative to said rim; and a device having a shank extending through said passageway, a head at the outer end of said shank having a portion disposed in said slot and adapted to abut said end faces thereof preventing relative rotary movement between said tire and said rim, a flange extending from said head and being offset from said portion and overlapping said tire outer side face preventing lateral movement of said tire outwardly relative to said rim, said shank at its inner end extending inwardly beyond said rim, and means securing said shank inner end to said rim.

5. A railway vehicle wheel comprising a wheel center having a rim provided with a peripheral cylindrical face providing a continuous uninterrupted contact portion, opposite side faces and a transverse passageway opening through said side faces; a tire having a cylindrical face providing a continuous uninterrupted contact portion in engagement with said rim contact portion, and a lip extending radially inwardly from said tire cylindrical face in overlapping relation with the adjacent rim side face, and a slot in and confined to said lip in line with said passageway, said slot having spaced end faces, said lip preventing relative lateral movement between said tire and said rim in one direction; and a device having a shank extending through said passageway, a head at one end of said shank having a portion disposed in said slot and adapted to abut said end faces thereof preventing relative rotary movement between said tire and said rim, a flange extending from said head and being offset from said portion and overlapping the adjacent side wall of said tire preventing relative lateral movement between said tire and said rim in the opposite direction, said shank at its other end extending beyond said rim, and means securing said shank other end to said rim.

6. A railway vehicle wheel comprising a wheel center having a rim provided with a peripheral cylindrical face providing a continuous uninterrupted contact portion, opposite side faces and a transverse passageway opening through said side faces; a tire having a cylindrical face providing a continuous uninterrupted contact portion in engagement with said rim contact portion, a lip extending radially inwardly from said tire cylindrical face in overlapping relation with the adjacent rim side face, and a slot in and confined to said lip in line with said pasageway, said slot having spaced end faces, said lip preventing relative lateral movement between said tire and said rim in one direction; and a device having a shank extending through said pasageway, a head at one end of said shank having a portion disposed in said slot and adapted to abut said end faces thereof preventing relative rotary movement between said tire and said rim, a flange extending from said head and being offset from said portion and overlapping the adjacent side wall of said tire preventing relative lateral movement between said tire and said rim in the opposite direction, said shank at its other end extending beyond said rim and being threaded, and a lock nut screwed on said shank threaded end and bearing tightly against the adjacent side face of said rim.

7. In a railway vehicle wheel of the class wherein the tire is shrunk upon the wheel center, a tire, an inwardly directed lip on the tire having a radial slot therein, and means anchored in the wheel center to prevent lateral and rotational movement of the tire in reference to the wheel center, said means having a head with two portions, one portion extending outwardly beyond the lip to overlap the tire, thereby to prevent lateral movement of the tire, and the other portion extending into the lip slot to prevent rotational movement of the tire, in reference to the wheel center.

8. A railway vehicle wheel comprising a wheel center having a rim, a tire, a lip on the tire extending radially inwardly to overlap the wheel center, thereby to prevent lateral inward movement of the tire in reference to the center, a slot in the lip, a passageway through the wheel center, and a device for maintaining the tire against lateral outward movement and against rotary movement in reference to the wheel center, such device being mounted in the center passageway and having an integral head with two portions, one portion overlapping the tire, and the other portion extending in the lip slot.

9. A railway vehicle wheel comprising a wheel center having a rim provided with a peripheral cylindrical face and opposite side faces; a tire having a cylindrical face in engagement with the rim cylindrical face, and an inner face in alignment with the inner face of the wheel center; a lip on the tire extending radially inwardly to overlap the wheel center, thereby to prevent lateral movement of the tire inwardly; a radial slot on the lip; a passageway through the wheel center; and a device to maintain the tire against lateral movement outwardly and against rotary movement in reference to the wheel center which comprises a threaded shank extending through the pasageway, a head upon the shank having inner and outer portions, the latter of which overlaps the tire to prevent it from moving outwardly in a lateral direction and the former of which extends into the lip slot to prevent the tire from rotating in respect to the wheel center, and adjustable means threaded to the shank and in engagement with the inner faces of the tire and wheel center to maintain the outer head portion in clamped relation to the tire.

HUNTER MICHAELS.

REFERENCES CITED

The following references are of record in the file of this patent:

UNITED STATES PATENTS

| Number | Name | Date |
|---|---|---|
| 610,501 | Snyder | Sept. 6, 1898 |
| 631,548 | Swan | Aug. 22, 1899 |
| 1,177,296 | Bentley | Mar. 28, 1916 |
| 1,327,846 | Todd | Jan. 13, 1920 |
| 1,468,443 | Esmarian | Sept. 18, 1923 |
| 2,380,862 | Michaels | July 31, 1945 |